United States Patent [19]

Heffner

[11] 4,054,481
[45] Oct. 18, 1977

[54] MECHANISM FOR ASSEMBLYING MULTI-STRATE PANEL WITH PLASTIC KEYS

[75] Inventor: George Heffner, University City, Calif.

[73] Assignee: Rohr Industries, Inc., Chula, V.I.STA, Canada

[21] Appl. No.: 678,731

[22] Filed: Apr. 21, 1976

[51] Int. Cl.$^2$ .............................................. B32B 1/06
[52] U.S. Cl. .................................. 156/389; 156/500; 29/460; 425/225; 425/573
[58] Field of Search ................ 425/225, 248; 156/389, 156/500

[56] References Cited

U.S. PATENT DOCUMENTS

| 2,436,122 | 2/1948 | Rotsler | 425/225 X |
| 3,029,174 | 4/1962 | Schultheiss | 156/500 X |
| 3,046,602 | 7/1962 | Houvener | 425/225 X |
| 3,252,181 | 5/1966 | Hureau | 156/500 X |
| 3,512,216 | 5/1970 | Voelker | 425/248 UX |
| 3,671,159 | 6/1972 | Greenberg et al. | 425/248 X |
| 3,682,744 | 8/1972 | Person | 156/389 |
| 3,947,196 | 3/1976 | Tribbett | 425/248 |

Primary Examiner—Charlie T. Moon
Attorney, Agent, or Firm—Patrick J. Schlesinger; Frank D. Gilliam

[57] ABSTRACT

For assemblying a plurality of extruded aluminum strakes with their edges formed for interconnection by plastic key joints, thereby to form a side wall for a transit vehicle, a panel support is formed to support a required plurality of the strakes in completed conformation. Clamping mechanism then squeezes the strakes laterally to a designed assembled width, thereby interlocking the joints, and opening up a key-forming passage lengthwise within each joint. An adhesive injecting manifold is mounted for reciprocation toward and away from one end of a panel on the support, with a nozzle on each of a plurality of outlets of the manifold for sealed engagement, one with each panel joint passage. The manifold inlet has controlled connection to a supply of pressurized, flowable, hardenable, key-forming compound for injection into the joint passages, with flushing means arranged for alternate connection to the nozzles for flushing out the nozzles and manifold after use.

10 Claims, 7 Drawing Figures

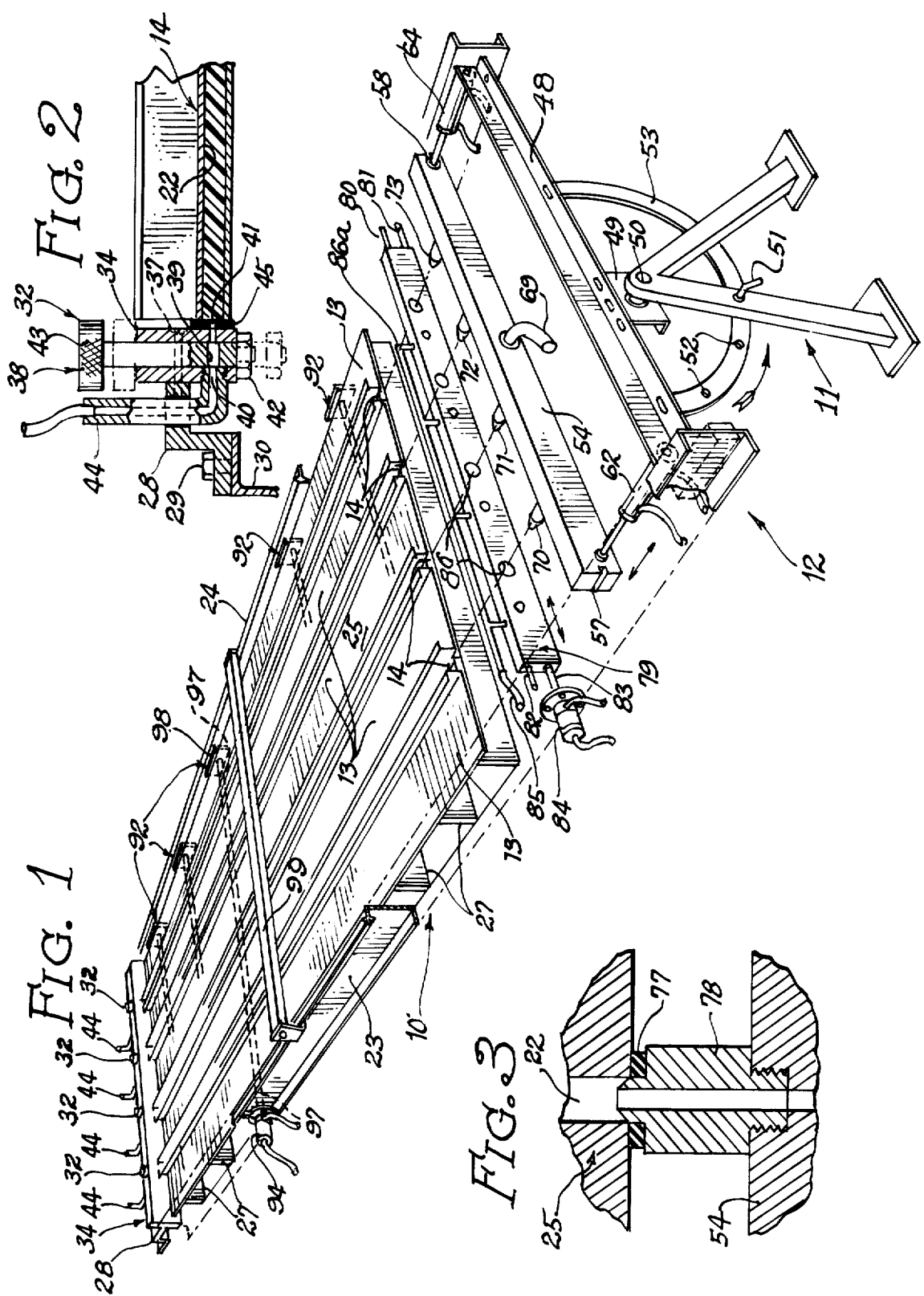

4,054,481

MECHANISM FOR ASSEMBLYING MULTI-STRATE PANEL WITH PLASTIC KEYS

BACKGROUND OF THE INVENTION

In the building of large, panel-type structures, for example, the side walls of transit vehicles such as buses and rail cars, a growing practice is to make at least a portion of each side wall by assembling a plurality of extruded aluminum strakes in edge-to-edge relation, the strakes being interconnected by outwardly inconspicuous or decorative joint means. U.S. Pat. application Ser. No. 594,828, filed July 10, 1975, now U.S. Pat. No. 3,992,846, Applicant K. W. Tantlinger, and assigned to the assignee of the present invention, discloses one such joint means, wherein, when the part of the joint are seated in relatively interlocked condition, a key-forming passage is formed throughout the full length of each joint. When these joint passages are filled with flowable, hardenable compound, which, in the present specification and claims is termed as "adhesive," the joints are firmly secured in such interlocked condition by the plastic keys thus formed.

The present invention provides mechanism for assembling a plurality of strakes in desired form, squeezing the strakes laterally together to designed width, thereby opening up the joint passages, injecting the adhesive simultaneously into a plurality of these joint passages, and thereafter flushing residual adhesive from the nozzles, and from the manifold and ducts associated therewith.

SUMMARY OF THE INVENTION

For making a multi-strake panel of the type described, a support is provided to support a required plurality of the plastic key-jointed strakes in desired surface conformation, with a nozzle support manifold having a plurality of nozzles thereon. The nozzle manifold is reciprocable between retracted position, clear of a flushing manifold, also mounted on the support, and a selected advanced positions wherein the nozzles are advanced into sealed engagement with either (1) the respective joint passages, or (2) the respective branches of the flushing manifold. Means also is provided at the downstream end of each of the joint passages for individual control of the flow of adhesive therethrough.

BRIEF DESCRIPTION OF THE DRAWINGS

Objectives and advantages of the invention will be apparent from the following description and the accompanying drawings, wherein:

FIG. 1 is a perspective, partially exploded view of a mechanism embodying the invention, and shows the panel support and assembly mechanism with the adhesive injecting nozzles advanced into sealed relation with their respective joint passages, and the flushing bar retracted to clear the nozzles for such advance.

FIG. 2 is an enlarged, fragmentary, vertical, longitudinal, sectional view through the terminal end of one of the joint passages, and shows the adhesive shut-off valve for such passage.

FIG. 3 is a further enlarged, fragmentary, diametrical, sectional view through a modified form of injector nozzle.

DETAILED DESCRIPTION OF THE ILLUSTRATIVE FORM OF THE INVENTION

Figure 4:
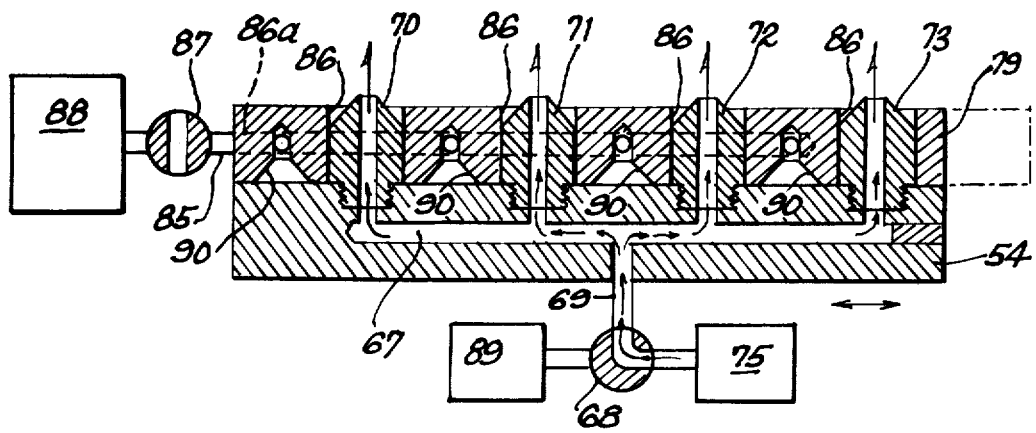
FIG. 4 is a diagrammatic, sectional view of the nozzle manifold and flushing manifold, taken along the plane defined by the nozzle axes, the nozzles being shown advanced, through the holes in the retracted flushing bar, for sealed communication with their respective joint passages, the direction of adhesive flow being indicated by the arrows.

Referring to the drawings in detail, the illustrative form of the invention comprises a table top 10 pivotally supported for tiltable adjustment on the upper ends of a pair of A-frame end members, only the near one 11 of which is shown, see FIG. 1. The table 12 thus formed is primarily intended for assembling a plurality of extruded strips, herein referred to as strakes 13, and connecting them together by interlocking joints 14 of the type shown in detail in FIGS. 6 and 7, and disclosed in patent application, Ser. No. 594,828, referred to previously herein.

Figure 6:
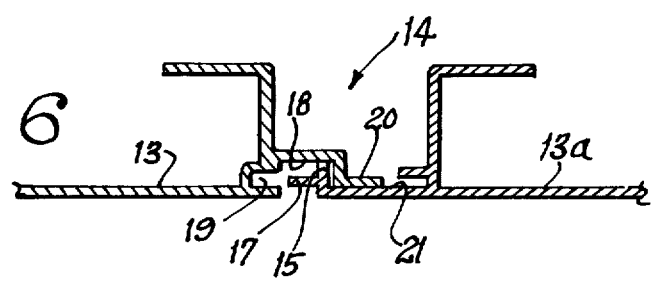
FIG. 6 is an enlarged, fragmentary, transverse, sectional view of a strake joint of the type disclosed in patent application Ser. No. 594,828, referred to previously herein, with the two halves of the joint in their position of initial engagement.

In the initial position of engagement of the joints 14 as shown in FIG. 6, an inturned flange 15, formed along the edge of strake 13a, and a laterally outwardly projecting tongue 17 thereon, are inserted in a channel 18 formed along the adjoining edge of the other strake 13, a recess 19 being provided in the laterally inward side of channel 18 to receive the tongue 17. Also, in this initial position of interconnection of the strakes, an outwardly extending tongue 20 on the laterally outward side of channel 18 is clear of a recess 21 provided on strake 13a. Moving the strakes 13 and 13a together to their interlocked position of FIG. 7 causes the tongues 17 and 20 to enter the recesses 19 and 21, respectively, while at the same time the inturned flange 15 moves away from the laterally outward wall of the channel 18 to open up a passage 22 within the joint 14.

The table top 10 comprises a pair of parallel channel side members 23 and 24, mounted with their open sides facing outwardly, and spaced apart by a distance slightly greater than the width of a panel 25 to be assembled thereon. A plurality of edgewise upright cross members 27 are mounted to extend transversely between the side members 23 and 24, and the upper edges of these cross members are shaped to define a surface corresponding to the exterior or lower surface of such panel. The illustrative panel 25 is flat, but if a curved panel is to be assembled, then the upper edges of these cross members 27 are shaped to define such surface.

The table top side members 23 and 24, portions of the near one 23 being broken away to disclose structure therebeyond, project upwardly slightly above the surface defined by the upper edges of the cross members 27, and the side members also extend at both ends beyond the area occupied by such panel 25.

At the far end of the table top 10, as shown in FIG. 1, a Z-shaped bar 28, see also FIG. 2, extends transversely across between the channel side members 23 and 24, and is secured by bolts 29 to the upper edge of a table top cross member 30, which is mounted to extend transversely across between the side members 23 and 24. A plurality of adhesive control valves 32 are provided in a valve bar 24, which is secured by screws 37, see FIG. 2, to the forwardly facing edge of the upper flange of the Z-bar 28. One of the adhesive control valves 32 is located to register with each of the joint passages 22 of such panel 25.

Each adhesive control valve 32 comprises a valve plunger 38, fitted for sealed, axial, slidable movement into a vertical hole provided therefor in the valve bar 34. If the plunger 38 and its hole are round, a key or other suitable or conventional means, not shown, is provided to prevent rotative displacement of the plunger. The latter has a valve hole 39 transversely therethrough, located to register with coaxial valve holes 40 and 41 through the valve bar 34 when the plunger is in its uppermost, open position. Upward movement of the plunger 38 is limited by a nut 42, screwed onto a reduced, threaded, lower end portion of the plunger to align the plunger valve hole 39 with the other holes 40 and 41 as shown in FIG. 2. A head 43 on the upper end of the plunger 38 limits its downward movement to closed position. A bent sight tube 44 has its reduced lower end fitted and secured in each rearward valve hole 40 in the valve bar 34, while the upper end of each of these sight tubes extends above its plunger 38 in the latter's uppermost limit of movement.

A seal 45 which may be of suitable elastomeric material, is bonded to the forward face of the valve bar 34, and is located to align with the rear edge of a panel 25 assembled on the table 12. A plurality of openings are provided in the seal 45 to register, one with each of the forward valve holes 41, and also with each of the passages 22 in a panel 25 assembled on the table.

The forward end of the table top 10, which is assumed to be the near end as shown in FIG. 1, has an angle cross member 48 mounted transversely across between the table side members 23 and 24, and a short length 49 of channel material is secured centrally to the underside of this cross member 48 to support a pivot pin 50, which is journaled in a usual bearing provided in the upper end of the A-frame 11. Similar, or other suitable pivotal support means, not shown, is provided co-axially of the pivot pin 50 for the other end of the table 12, and a locking pin 51 is provided to enter a selected one of a plurality of holes 52 provided in an arcuate member 53 secured to the under side of the table top 10 to anchor the table top at a selected angle of tilt.

A nozzle bar 54 is mounted to extend transversely across between the table side channels 23 and 24 for movement toward and away from the end of a panel 24 assembled on the table 12. As illustrated, the nozzle bar 54 is provided with notches 57 and 58 in its ends, which are fitted to move slidably along support rails, not shown, secured lengthwise, one along the inner side of each of the table side channels 23 and 24.

Suitable actuating means, for example, a pair of air or hydraulic cylinders 62 and 64 are mounted, one between each end of the nozzle bar 54 and the angle member 48 for selectively advancing and retracting the nozzle bar. Suitable or conventional air or hydraulic control means, not shown, control the actuation of the cylinders 62 and 64, and thereby the actuation of the nozzle bar.

Manifold duct means 67, see FIGS. 3 and 4, is provided in the nozzle bar 54, and, with a two-way valve 68 in its position of FIG. 4, communicates, via a pressure hose 69, with a plurality of nozzles 70, 71, 72 and 73, mounted on the nozzle bar. In said position of the valve 68, a supply of pressurized adhesive, indicated by the rectangle 74, see FIG. 4 and 5, flows through the nozzles into their respective joint passages 22 in panel 25.

The nozzles 70, 71, 72 and 73 are of a number, and are so located in the nozzle bar 54, that each thereof will register with one of the joint passages 22 of a panel 25 assembled on the table 12.

Various means may be provided for sealing the nozzles to their respective panel passages, for example, by making the nozzle tips conical, as shown in FIGS. 3 and 4, and reaming out the ends of the panel passages so that the nozzles have sealing relation therewith; or by providing sealing means, for example, as shown in FIG. 3, wherein an elastomeric washer 77 is mounted in a seat formed in a modified nozzle 78 for pressure sealing engagement with the end of the panel 25 around each panel passage 22.

Interposed between the nozzle bar 54 and the near end of the panel 25 shown in FIG. 1, is a flushing bar 79, which is mounted for limited reciprocating movement transversely of the table 12. The flushing bar 79 has a pair of axially parallel guide and support pins 80 and 81, see FIG. 1, extending from the far end thereof, which pins are mounted for axial, slidable movement in a pair of axially parallel bushings, not shown, mounted in openings provided therefor in the far table top side member 24.

At the near side of the table 12 a single guide and support pin 82 is similarly mounted, while the piston rod 83 of an air or hydraulic cylinder 84 comprises a flushing bar guide and support member, and also provides the propulsive force for reciprocally actuating the flushing bar. Usual control means, not shown, are provided for actuating the cylinder 84 in order to selectively move the flushing bar 79 back and forth between its position shown in FIGS. 4 and that of 5.

In order to allow the nozzles to be advanced to their adhesive-injecting position of FIG. 4, a plurality of nozzle-clearance holes 86 are provided in the flushing bar 79, each opening being of a size to allow a nozzle to pass freely therethrough, and so located that when the flushing bar is in its retracted position of FIGS. 1 and 4, these nozzle clearance holes are axially aligned with their respective nozzles. The nozzles 70–73 are of sufficient length to extend, when the nozzle bar is advanced to its position of FIG. 4, entirely through the flushing bar 79 and into pressure sealing engagement with their respective joint passages 22 in a panel 25 on the table.

Figure 5:
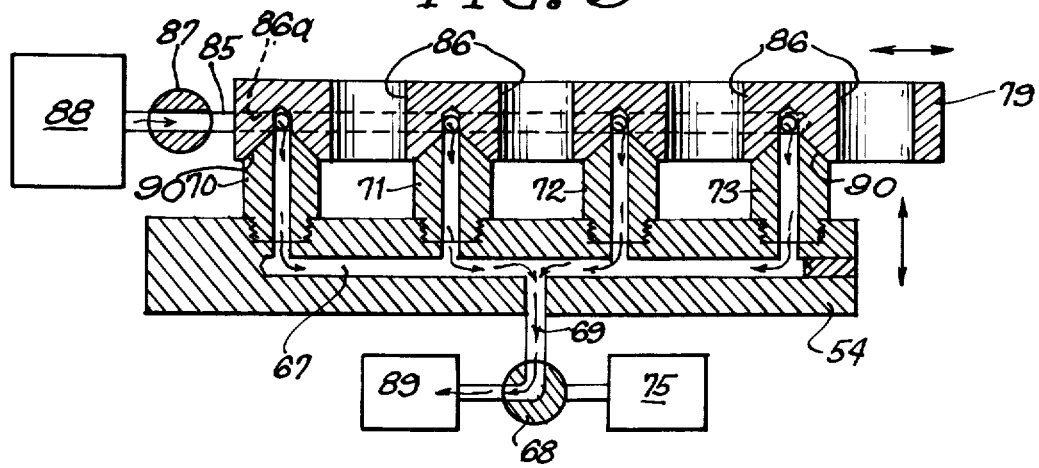
FIG. 5 is a view similar to FIG. 3, but showing the flushing manifold actuated, and the nozzles advanced for sealed communication with their respective branches thereof, the direction of solvent flow being indicated by the arrows.

Upon retraction of the nozzles clear of the flushing bar 79, actuation of the cylinder 84 moves the flushing bar 79 endwise toward the right to its actuated position of FIG. 5, wherein the nozzles 70–73 are respectively axially aligned with a plurality of conical, recessed seats 90 provided in the flushing bar. Each of the seats 90 communicates with a solvent manifold duct 86a, and thence, via a solvent hose 85 and a solvent control valve 87 with a supply 88 of pressurized solvent of a type suitable for flushing out the specific adhesive used in each case for injection into the joint passages.

During flushing, the two-way valve 68 is turned to its position of FIG. 5 to divert exiting flushing fluid into a waste solvent receiving tank 89. The solvent control valve 87 is then opened as shown in FIG. 5 to allow solvent from the pressurized supply 88 thereof to flow through the nozzles and ducts communicating therewith to flush out adhesive remaining from the adhesive injecting step.

For drawing the strakes 13 of a panel 25 together to a predetermined condition on the table top 10, thereby to seat their respective joints 14 in interlocked relation and open up the joint passages 22 as shown in FIG. 6, suitable or conventional clamping means, such as a selected plurality of hydraulic clamps 92, see FIG. 1, are provided. A hydraulic cylinder 94, only one of which is shown, is mounted on the outer side of the near channel side member 23 for each clamp, and the elongated piston rod 97 thereof extends transversely across beneath the panel 25. A clamp jaw 98 is mounted on the far end of each piston rod 97 for clamping engagement with the far side of the panel 25. Usual control means, not shown, are provided for operating the clamps selectively as required.

Since the specific type of clamping means provided is not a feature, per se, of the invention, and other types, such as conventional hand screws, etc., may be employed for this purpose, further details of this feature are omitted. Presently preferred practice is to apply the clamping force at one end of the panel, and then to proceed progressively from one clamp to the next, applying clamping force as required until the whole length of the panel has been drawn in to specified requirements.

OPERATION OF THE ILLUSTRATIVE FORM OF THE INVENTION

In operating the illustrative form of the invention, the table top 10 is positioned by means of the pin 51 either level or at a desired angle of tilt, the nozzle bar 54 and flushing bar 79 are retracted as shown in FIG. 1, with the nozzle clearance holes 86 axially aligned with their respective nozzles 70-74. Also, the adhesive control valves 32 are in their open position, the clamps 92 are extended, and the valves 87 and 68 are closed.

A plurality of strakes 13 to be assembled are then laid on the table with their joints in their initial position of assembly as shown in FIG. 6, and with their far ends aligned closely adjacent the adhesive control valve bar 34.

Figure 7:
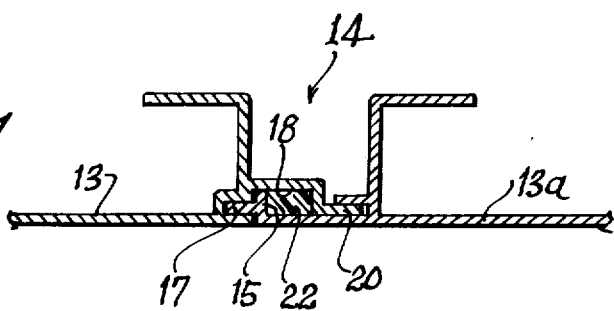
FIG. 7 is a view similar to FIG. 5, but with the strakes moved together edgewise into interlocked relation, thereby opening the key-forming joint passage, which is shown filled with adhesive.

The clamps 92 are then operated, preferably successively as explained previously herein, to draw the strakes together into their fully interlocked position of FIG. 7, and to an accurately designated width. To insure against buckling of the panel under clamping pressure, a conventional hold-down bar 99 of suitable rigid material preferably is clamped across the top of the table as shown in FIG. 1 to bear on the strakes during the clamping operation. In the event that the nozzles shown in FIGS. 1, 4 and 5 are employed, the near ends of the joint passages 22 are reamed out to provide seats for their respective nozzles.

The nozzle bar 54 is then advanced by the cylinders 62 and 64, through the nozzle clearance holes 86 provided in the flushing bar 79, and into sealed relation with their respective joint passages 22.

The two-way valve 68 is then turned to its position of FIG. 4 to communicate the pressurized supply 75 of adhesive, through the hose 69, the manifold duct 67 and the nozzles 70-73, with the respective joint passages 22, thereby forcing the flowable, solidifiable adhesive through the joint passages. As the adhesive reaches the far end of each joint passage and flows through its respective adhesive control valve 32, and is visible exiting from its sight tube 44, the adhesive control valve 32 for that passage is closed.

When all of the joint passages are thus filled, the two-way valve 68 is closed, and the nozzle bar 54 is withdrawn clear of the flushing bar 78 by the cylinders 62 and 64. The flushing bar cylinder 84 is then actuated to move the flushing bar 79 toward the right from its position illustrated in FIGS. 1 and 4 to that shown in FIG. 5, thereby to align the nozzles with their respective seats 86, and the nozzle bar is advanced to its position of FIG. 5 to communicate the nozzles with the ducts of the flushing manifold 79.

The two-way valve 68 is then turned to its position of FIG. 5 to communicate the hose 69 with the waste solvent tank 89, and the flushing fluid control valve 87 is opened, thereby flushing out the unused adhesive from the nozzles and the various ducts communicating therewith.

Any excess adhesive which may have seeped out during the foregoing procedures is then removed, the adhesive in the joints is solidified, either by the passage of time or the application of heat or other means as may be required by the specific type of adhesive employed, the clamps 92 are released, and the completed panel 25 is removed from the table.

The invention provides a quick, simple and accurate mechanism for assembling and securing panels of the type specified, and requires no highly skilled labor, in fact, a minimum of manhours of any type.

Having thus described the invention, what is claimed as new and useful and desired to be secured by United States Letters Patent is:

1. Mechanism for injecting flowable solidifying adhesive simultaneously into a plurality of key-forming passages in the joints of a panel comprising a plurality of assembled strakes joined together by interlocking joints, each of which joints has one such key-forming passage extending lengthwise therethrough, said mechanism comprising:

a support for such panel;

a nozzle manifold mounted endwise beyond a panel assembled on the support for reciprocation toward and away from a selected, upstream end of such panel;

a plurality of nozzles mounted on said nozzle manifold and in open communication therewith, each of the nozzles being aligned with, and shaped and located for advance into sealed engagement with, one of the key-forming passages in such panel mounted on the support upon selected advance of the nozzle manifold toward such panel;

controlled actuating means mounted for reciprocative actuation of the nozzle manifold;

a flushing manifold having a plurality of nozzle seats thereon, each of the nozzle seats having an opening therein communicating with the flushing manifold, the flushing manifold being mounted for movement between retracted position, in which the flushing manifold is clear of the nozzles throughout the limits of reciprocative movement of the nozzle manifold, and actuated position, in which one of the nozzle seats is aligned with each of the nozzles for sealed communication of the nozzles with the flushing manifold upon selected advance of the nozzle manifold;

controlled actuating means mounted for actuation of the flushing manifold between its retracted and actuated positions;

a supply of pressurized adhesive mounted for controlled communication with the nozzle manifold;

first valve means for selectively controlling the flow of adhesive from the supply thereof through the nozzle manifold, the nozzles, and the key-forming passages with the nozzles in seated communication therewith;

a supply of pressurized solvent mounted for controlled communication with the flushing manifold; and second valve means for selectively controlling the flow of flushing solvent through the flushing manifold and the nozzles when in sealed communication therewith.

2. Mechanism as claimed in claim 1, wherein the direction of solvent flow through the nozzles is the reverse of the direction of adhesive flow therethrough.

3. Mechanism as claimed in claim 1, wherein an individual flow control valve is mounted on the panel support for sealed engagement with the downstream end of each of the panel joint passages.

4. Mechanism as claimed in claim 1, wherein the panel support comprises a plurality of transversely extending support members, the upper surfaces of the support members being shaped to define a designed surface for support of a panel assembled and supported thereon.

5. Mechanism as claimed in claim 4, wherein the panel support comprises a base portion and a top panel support comprises a base portion and a top panel support portion mounted for tilting movement thereon, and means for anchoring the top panel support portion at a selected angle of tilt relative to the base portion.

6. Mechanism as claimed in claim 4, wherein the support members are spaced apart lengthwise of the table, and a plurality of panel clamps are mounted on the support at selected, spaced intervals lengthwise of a panel to be assembled thereon for clamping engagement with the sides of such panel, thereby to draw the joints of such panel into selected, interlocked relation with each other.

7. Mechanism as claimed in claim 4, wherein warp control mechanism is provided to prevent warping of a panel induced by actuation of the clamps.

8. Mechamisn as claimed in claim 1, wherein the flushing manifold comprises a bar portion interposed between the nozzle manifold and an end of a panel assembled on the support, said bar portion having a plurality of holes therethrough, each of which holes is located for axial alignment with one of the nozzles with the flushing manifold in its retracted position, each of such holes being of a size to admit the nozzle aligned therewith for free passage therethrough into sealed engagement with the panel joint passage with which such nozzle is also aligned.

9. Mechanism as claimed in claim 1, wherein the discharge end of each of the nozzles is conically tapered, and the panel surrounding the upstream end of each of the panel joint passages is correspondingly shaped for sealing engagement with its respective nozzle.

10. Mechanism as claimed in claim 1, wherein the discharge end of each nozzle has mounted thereon an elastomeric annulus surrounding its nozzle discharge opening, which elastomeric member is deformed into sealing engagement with the area of the panel end surrounding the joint passage for said each nozzle upon selected advance of the nozzle manifold.

* * * * *